US011522841B1

(12) United States Patent
    Lovitt

(10) Patent No.: US 11,522,841 B1
(45) Date of Patent: Dec. 6, 2022

(54) THIRD-PARTY DATA MANIPULATION WITH PRIVACY CONTROLS

(71) Applicant: Meta Platforms Technologies, LLC, Menlo Park, CA (US)

(72) Inventor: Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 587 days.

(21) Appl. No.: 16/407,216

(22) Filed: May 9, 2019

(51) Int. Cl.
    *H04L 9/40* (2022.01)
    *G06F 21/62* (2013.01)
    *H04N 7/14* (2006.01)

(52) U.S. Cl.
    CPC ...... *H04L 63/0471* (2013.01); *G06F 21/6263* (2013.01); *H04L 63/0823* (2013.01); *H04N 7/147* (2013.01)

(58) Field of Classification Search
    CPC ............. H04L 63/0471; H04L 63/0823; G06F 21/6263
    See application file for complete search history.

(56) References Cited

U.S. PATENT DOCUMENTS

| | | | | |
|---|---|---|---|---|
| 2016/0240004 | A1* | 8/2016 | Ur | G06T 19/20 |
| 2018/0268240 | A1* | 9/2018 | Loce | G11B 27/105 |
| 2019/0238519 | A1* | 8/2019 | Bikumala | H04L 9/16 |
| 2020/0364612 | A1* | 11/2020 | Siravara | G06F 21/602 |
| 2021/0311618 | A1* | 10/2021 | Barton | G06F 3/0482 |

* cited by examiner

*Primary Examiner* — Olugbenga O Idowu
(74) *Attorney, Agent, or Firm* — FisherBroyles, LLP

(57) ABSTRACT

The disclosed computer-implemented method may include receiving, from a third party, a portion of data or computer-executable logic that is part of a specified model. Each model may include various portions of independently verifiable computer-executable logic. The method may further include receiving data at a processing engine. The processing engine may be configured to apply the specified model to the received data. The method may then execute the specified model at the processing engine to modify the received data and send the modified data to an application that is configured to process the modified data. Various other methods, systems, and computer-readable media are also disclosed.

22 Claims, 8 Drawing Sheets

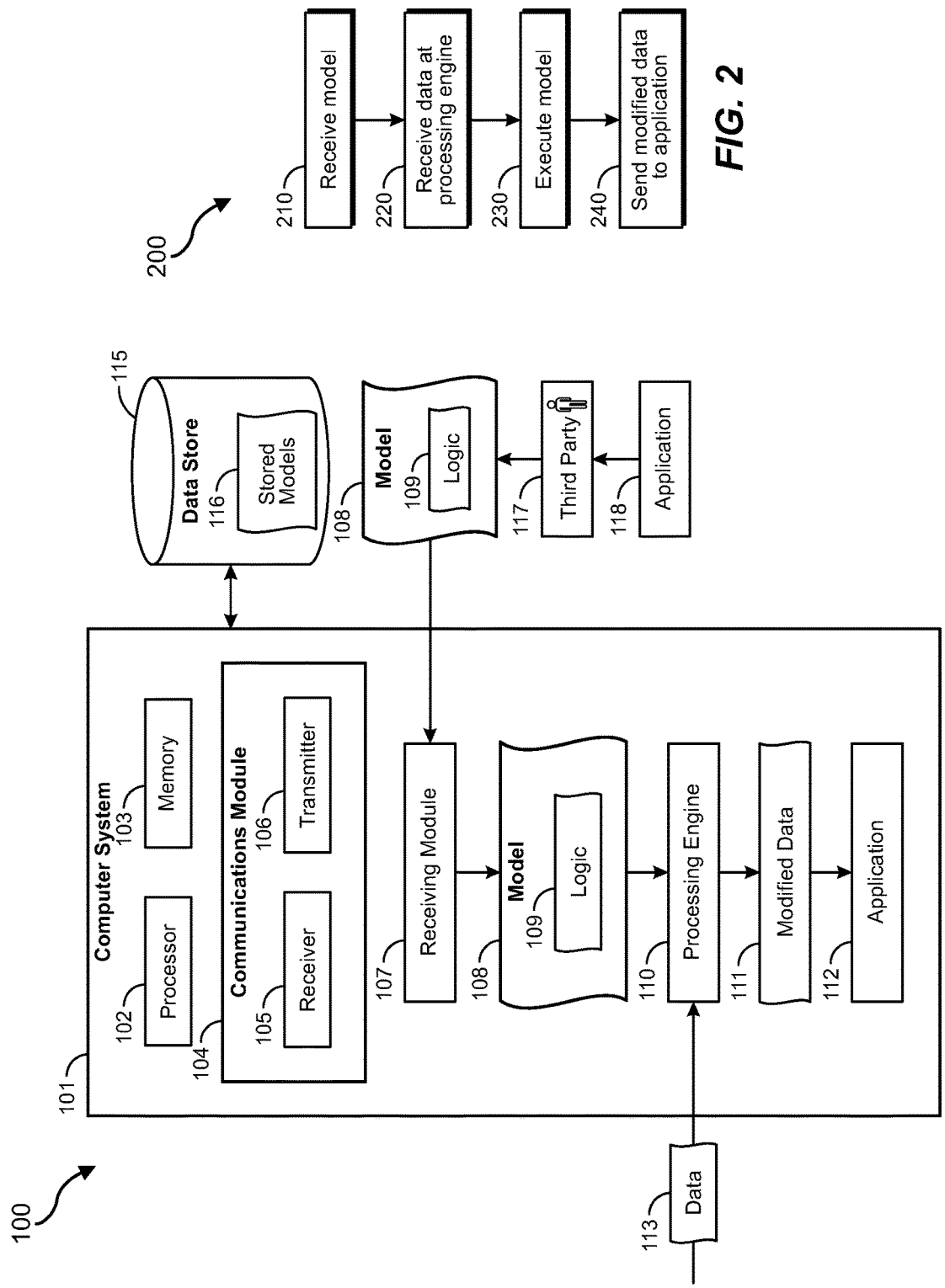

THIRD-PARTY DATA MANIPULATION WITH PRIVACY CONTROLS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 illustrates an example computing environment in which the embodiments herein may be executed.

FIG. 2 illustrates a flow diagram of an exemplary method for modifying data while maintaining privacy.

DETAILED DESCRIPTION OF EXEMPLARY EMBODIMENTS

Figure 3:
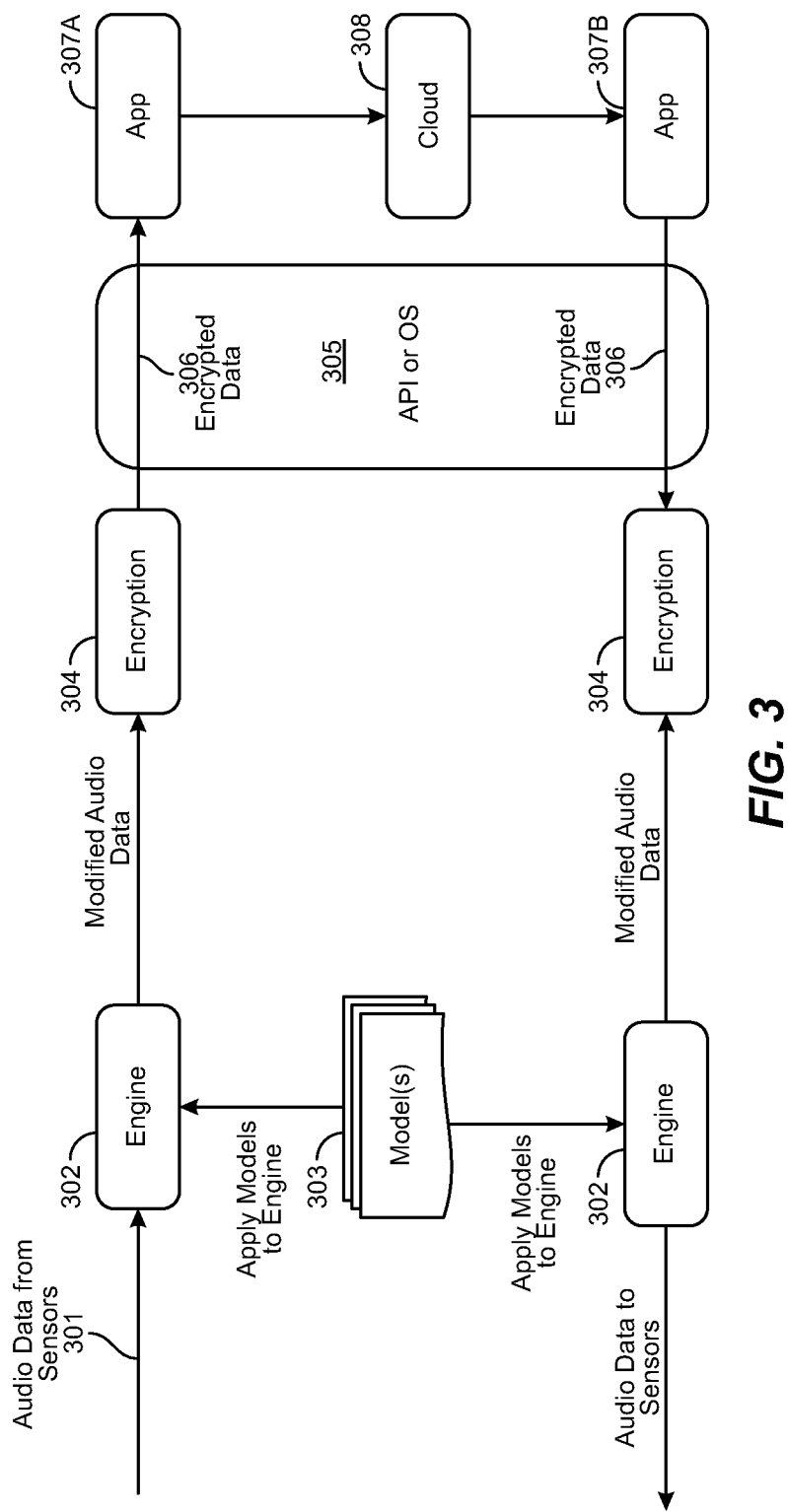
FIG. 3 illustrates an alternative example computing environment in which the embodiments herein may be executed.

Embodiments of the present disclosure are generally directed to modifying data (or allowing third parties to modify data) while maintaining a user's privacy and security of personally identifiable information. Many times, when a user is speaking on the phone or drafting an email or performing other tasks on their smartphone or other electronic device, the user may wish for the data associated with these phone calls, emails, or other tasks to remain private. In some instances, however, it may be desirable for a third party to perform modifications to this type of otherwise private data. For example, if a user was talking on the phone or conversing on a video chat application, the video chat application may desire to apply a transformation to the user's voice (e.g., to change the user's voice to sound like a scary villain). In traditional systems, the user would have to grant the video chat application full access to their audio and video streams in order for the video chat application to perform the voice modification. By granting full access to their audio and video data, the user would effectively relinquished control over that data and it would no longer be private. Even if the third-party provider of the video chat application never makes that data public, the data is still available to them and, as such, could be transferred to the wrong party or made public accidentally or through a data breach.

The embodiments described herein may provide a way for a third party to modify data without any third-party application code having access to that data. For example, the third party may provide independently verifiable computer-executable logic (separate from application code) that may be executed by a processing engine. The processing engine may be a specific-purpose integrated circuit that has limited inputs and limited, known outputs. Such a processing engine may receive data such as voice or video data, for example, perform a specific transformation on that data, and output a known, modified data stream that can be independently verified. This modified data stream may then be passed to the third-party application (e.g., a video chat application) where the modified data (e.g., the user's voice that has been modified to sound like a scary villain) may be presented to the user. These embodiments will be described further below with reference to computing environment 100 of FIG. 1.

FIG. 1 illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a receiving module 107 that is configured to receive inputs from various electronic devices including smartphones, laptops, tablets, wearable devices, or other computing systems used by a user. For example, the receiving module 107 may receive data 113 from one or more electronic devices. The data 113 may correspond to audio data, video data, biometric data, textual data, image data, location data, or other types of data. In some cases, the data 113 may include multiple different types of data including, for example, both audio and video data. This data may be received from various electronic devices, entities, or parties including third party 117.

The receiving module 107 may receive data from third parties such as third party 117. The third party 117 may be any type of person or entity that is different from an operating system provider or platform provider (e.g., a social media platform provider). For instance, computer system 101 may be a computer system running a specified operating system or may be communicatively connected to a social media platform. The computer system 101 may have access to third-party applications (e.g., application 118) that run on computer system 101. The third-party application 118 may be provided by any number of different third parties and may be designed to run on a specified operating system or social media platform. To access this third-party application 118, a user of the computer system 101 may download the application 118 and launch the application on computer system 101. Once running on computer system 101, the third-party application 118 may have access to memory 103 on the device, data storage 115, processor 102 for data execution, communications module 104 for sending and receiving data, and potentially other hardware or software.

The third-party application 118 may not, however, have access to processing engine 110. The processing engine may be a secure processing environment that is isolated from the remainder of computer system 101. In some cases, the processing engine 110 may be completely separate from computer system 101, while in other cases, the processing engine may be part of computer system 101. The processing engine 110 may also be part of a virtual machine. The processing engine 110 may be prevented from accessing any shared memory (e.g., 103), and may have its own secure memory that is inaccessible by the operating system or by the processor 102. The processing engine 110 may be a physically separate piece of hardware (whether internal to or external to computer system 101) such as an application-specific integrated circuit (ASIC), a field-programmable gate array (FPGA), a digital signal processor (DSP), or other similar stand-alone chip configured to process data inputs in a specified manner. Or, the processing engine 110 may be part of computer system 101. For instance, the processing engine 110 may be part of or may be embedded inside of processor 102. In some embodiments, the processing engine 110 may be a silicon-based integrated circuit having computer-executable logic stored thereon that is designed to perform one or more specified tasks. These tasks may be independently verified so it can be shown that the processing engine does not have access to memory shared by the third-party application 118 and that the processing engine cannot be manipulated by outside programs or devices.

The processing engine 110 may be configured to execute models (e.g., model 108). A "model," as used herein, may refer to any type of program or computer-executable logic 109 that may be processed by a special-purpose computer. The computer-executable logic 109 may be an algorithm (such as a machine-learned algorithm) or other series of steps that may be performed to transform or modify data. The processing engine may process incoming data (e.g., 113) in a trusted, verifiable manner, according to the model 108 and the model's corresponding computer-executable logic 109. Once the processing engine 110 has finished processing the data 113 according to the computer-executable logic 109 in the model 108, the resulting modified data 111 may be passed to an application 112 (which may be the same as or different than the third-party application 118). The application 112 may then access the data and present it to the user of the computer system 101. These embodiments will be described in further detail below with regard to method 200 of FIG. 2, and with regard to the embodiments shown in FIGS. 3-8B.

FIG. 2 is a flow diagram of an exemplary computer-implemented method 200 for modifying data while maintaining privacy. The steps shown in FIG. 2 may be performed by any suitable computer-executable code and/or computing system, including the computer system 101 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may receive, from a third party, a portion of data or computer-executable logic that is part of a specified model. Each model may include various portions of independently verifiable computer-executable logic. The method may further include receiving data at a processing engine. The data may be received all at once in a chunk or may be received as part of a data stream that is continuously sent over time. The processing engine may be configured to apply the specified model to the received data. The method may then execute the specified model at the processing engine to modify the received data and send the modified data to an application that is configured to process the modified data.

Method 200 may include, at step 210, receiving, from a third party, at least a portion of data or computer-executable logic that is part of a specified model. For example, receiving module 107 of computer system 101 may receive model 108 from a third party 117. The model 108 may include one or more portions of data including weights for a given model (e.g., a deep neural network) or independently verifiable computer-executable logic 109. This computer-executable logic 109, as noted above, may include a series of independently verifiable steps that are to be performed on a set of data. The steps may have known inputs and known outputs that may be independently verified. This independent verification may ensure that no other programs or applications have access to the data 113 and may ensure that no other changes are being made to the data apart from those changes that are known and verified. Thus, if the incoming data 113 includes private information (e.g., biometric information, voice data, items which the user is viewing with augmented reality eyewear, etc.) or information that the user intends to be private, the model 108 and its corresponding logic cannot be used to alter or store that data in any manner other than the known, vetted manner.

Method 200 may next include, at step 220, receiving data at a processing engine, where the processing engine may apply the specified model to the received data. Accordingly, processing engine 110 may receive data 113 from a user's electronic device (e.g., audio data received at a microphone on the user's smartphone). The data may be raw and untouched by any other programs or applications. Once received at the processing engine, the processing engine 110 may execute the computer-executable logic 109 of the model 108, at step 230, to modify the received data 113. The processing engine 110 may thus apply the rules, algorithms, steps, methods, or other procedures of model 108 to modify the data. These modifications may include altering a voice, removing background noise, removing specified noises or speaking users, removing users from video, blurring a video background, blurring specified portions of video when filmed in certain locations, modifying biometric data that could personally identify a user (e.g., data received from a wearable device such as a watch), or performing other similar operations to modify the data.

Regardless of how the data 113 is to be modified, the systems described herein may be designed to securely and verifiably perform those modifications. In some cases, for example, third party 117 may provide some or all of the input data 113 or may modify the input data 113 in some manner. For instance, a third party may generate or have access to some portion of data that may be able to enhance or augment the input data 113. For example, the third party 117 may have more accurate global positioning system (GPS) data than is provided by the device (e.g., computer system 101). The third party 117 may provide this input data 113 to replace an incoming data stream or to augment a data stream. The third party modifying the data stream may even be different than the third party that provided the model 108. As such, a third party or third-party application may provide data that is processed through a model that itself is provided by a different third party.

Method 200 also includes, at step 240, sending the modified data to an application that is configured to process the modified data. Thus, for instance, when the processing engine 110 has finished modifying the data 113, the modified data 111 may be sent to application 112 (which may be native to computer system 101 or to an operating system running on computer system 101), to third-party application 118, or to some other native or third-party application or operating system. That application may then present the modified data 111 to the user or may perform subsequent processing on the modified data. Thus, in this manner, a third party may be able to provide a model that performs a limited-access operation on the user's data. This limited-access operation may apply the change(s) without any knowledge of the content of the data. This may protect the user's privacy while allowing third parties to offer creative changes and modifications to the user's data.

For example, FIG. 3 illustrates an embodiment in which a third party would like to provide a feature in an application they have created that would modify a user's voice to sound like a cartoon character. The application 307A created by the third party may be a video chat application, for example. The third party may have a model 303 that they provide to a computer system (e.g., computer system 101 of FIG. 1). The model may be a deep neural network (DNN), for example. This DNN model 303 may be configured to perform this transformation on the audio signal 301. The model may be sent by the third party to the processing engine 302. As noted above, the processing engine 302 may be in a segmented portion of the same CPU used to run the operating system 305 and/or the third-party application 307A, may be on a different CPU, may be in a virtual machine (VM), etc. Regardless of which form the processing engine takes, it may not have access to memory shared by the operating system or the third-party application in order to keep the data processing secure and provide known and verifiable outputs.

Applying the DNN to the input audio data 301, in this case, may result in a modified audio stream. In some embodiments, this modified audio data may be encrypted at 304 by the OS or by the electronic device manufacturer. As such, the third-party application 307A may not be able to access the data. The third-party application may then transfer this data using their servers and devices (and/or the cloud 308) to another application 307B (e.g., another party in the video chat). At application 307B, the operating system 305 may provide the keys necessary to decrypt the encrypted data 306. In this manner, the application may be prevented from having access to the audio data 301 or information about the audio data. Other, secondary or subsequent models 303 may also be used to further modify the data. The application 307A/307B, in this example, may act as the transport and the video chat or phone call may be end-to-end encrypted, avoiding making any of the users personally identifiable information available to the application.

Figure 4:
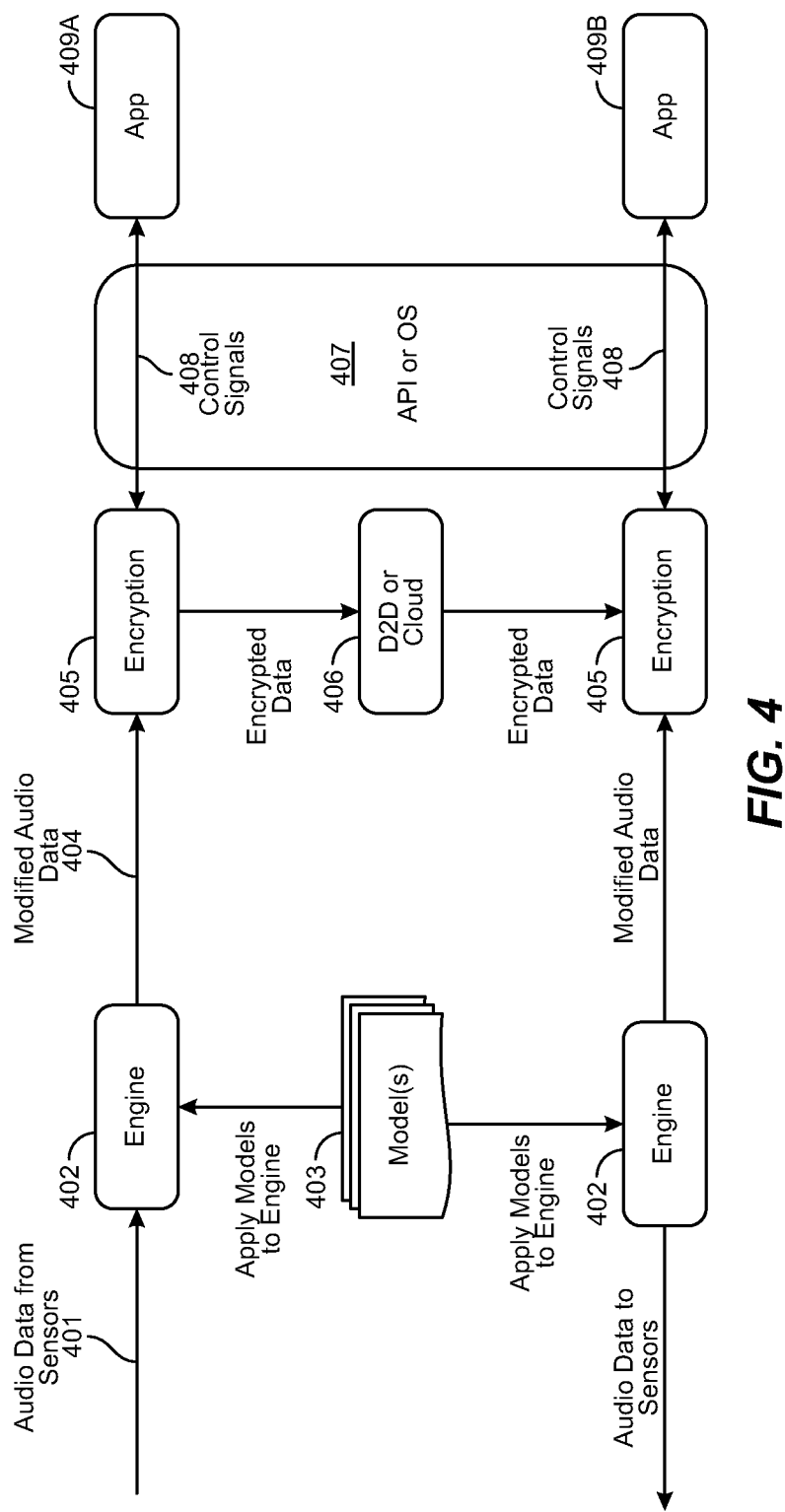
FIG. 4 illustrates an alternative example computing environment in which the embodiments herein may be executed.

FIG. 4 illustrates a similar computing environment, however in this embodiment, the operating system 407 performs the data transfer between applications 409A and 409B (e.g., through the cloud 406). The application 409A/409B may be configured to provide control signals. For example, the third-party application may be designed to flash the user's smartphone screen red when someone is talking. In this example, the application would not need to know what is being said, only that people are talking. Thus, when audio data 401 is received by processing engine 402, a model 403 may be designed to provide a signal 408 detectable by the application 409A. Even after encryption 405 by the operating system, this signal 408 may be detectable by the application 409. The model may thus detect and provide a "someone is talking" signal and provide that signal 408 to the application which may then render the screen to flash red as long as the signal is being received. Using such a system, the third-party application may not be able to access personally identifiable information about the audio stream 401, and the user's electronic device may be able to transfer the data (e.g., through cloud 406) on the behalf of the application or user.

In some embodiments, the application 409 may be configured to process the modified data after it has been modified by the model 403. This application 409 may be prohibited from communicating with or accessing the model 403. As such, the application 409 may be run on a separate operating system and device that is different than the operating system and/or device on which the processing engine 402 and the model 403 is run. In other cases, the processing engine 402 and operating system 407 may be run on the same electronic device but may be prevented from accessing the same memory areas. Moreover, the application 409 may be prevented (either via hardware or via software) from sending data inputs or portions of computer-executable code to the model. Thus, a third party may provide the application 409 and may provide the model 403, but the application may not communicate with or access the model 403 or the processing engine 402 after the model has been sent to and/or loaded by the processing engine. This allows the model to be independently verified, indicating that the model 403 is performing the specific tasks for which it was designed and no other tasks.

The model 403 sent by the third party may be a full set of computer-executable instructions including processes, routines, algorithms, functions, methods, or other code. Alternatively, the model 403 may include weights and setup parameters for a machine-learned model. In such cases, the model 403 may include weights for different parts of an engine (e.g., a neural network engine), and/or the setup parameters indicating how the engine is to be configured. In some embodiments, the processing engine 402 may be a digital signal processor (DSP) and the model may include computer-executable code where the DSP has a defined buffer inflow and outflow. This ensures that the model is applying a known process to the incoming data and that the model is not performing any type of processing that would enable the model 403 to know the content of the input data 401. In cases where the operating system 407 is configured to support isolated processes, the operating system may run the model 403 as an isolated process. This may occur as long as the isolated process does not have the ability to communicate with the application 409, and the application does not have the ability to communicate with the isolated process, even through shared memory.

The model 403 may be designed to provide known outputs for each type of data produced at the processing engine 402. For instance, if the input data is audio data, the output may be audio data at a different frequency, or audio data with a known voice enhancement. If the incoming data 401 is video data, the output from the processing engine 402 may be modified video data that has removed or blurred or changed the color of various pixels. If the input data 401 is biometric data from a user's wearable device, the output from the processing engine 402 may be enhanced biometric data that may be provided in a specified format. Many other types of input data may be provided, and each input type may have a corresponding known output type with a known output.

Figure 5:
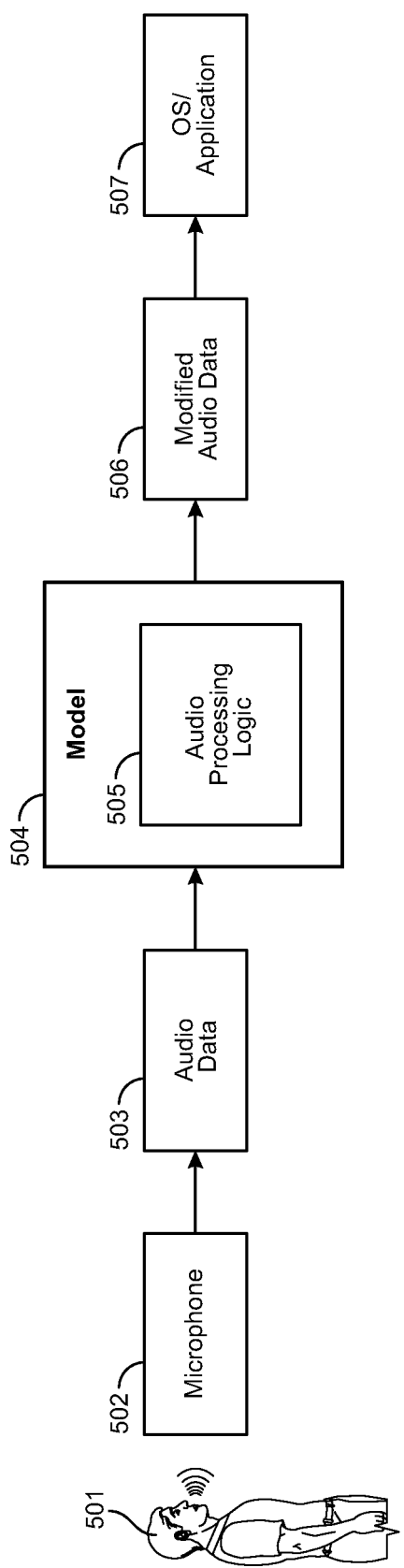
FIG. 5 illustrates an embodiment in which a model having audio processing logic modifies incoming audio data.

FIG. 5 illustrates an embodiment in which a user 501 speaks into a microphone 502. The microphone 502 converts the user's voice into an audio signal. The audio data 503 in the audio signal may be sent to a model 504 that has audio processing logic 505. This audio processing logic 505 may include logic configured to morph a user's voice. A third-party application (e.g., 507) may, for example, want to add voice morphing to their chat application. The audio stream 503 may be protected content and may be considered private by user 501 or by the owner of the device (if different than the user). In this example, the user 501 (or device owner) may not want to expose the raw audio data to the third party. Or, the device owner may want to establish a set of policies that govern which models may be run or whether encryption is required. The third-party application 507 may package a model 504 (e.g., machine learning recurrent neural network (RNN)) which is designed to perform the voice morphing in accordance with the established policies. The third party may provide this binary model to a processing engine (in whatever form it may take) and that processing engine may apply the audio processing logic 505 and morph the user's voice.

The modified audio data 506 may then be encrypted by the operating system and sent to the third party for use in the third-party application 507. In this manner, the private audio data 503 may be encrypted but also allow the third party to change the data or understand the data in a way that keeps the data private. The third-party chat application may then transmit the modified audio data 506 to another party or parties in the chat. Throughout this process, the raw audio data 503 may never be available to the third-party application 507. Other audio changes are also possible including changing the pitch or tempo of the user's voice, changing the pitch or tempo of a song, removing background noise, removing certain user's voices or removing other specific background sounds, or removing any other vocal characteristics identified by the user 501.

Figure 6:
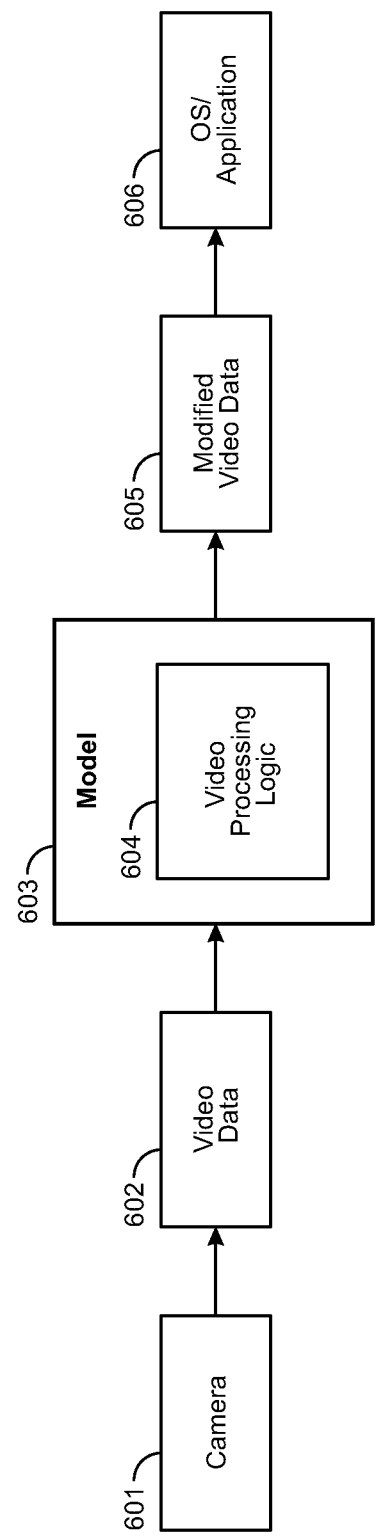
FIG. 6 illustrates an embodiment in which a model having video processing logic modifies incoming audio data.

FIG. 6 illustrates an embodiment in which a camera 601 (e.g., a camera on a user's smartphone) captures video data 602. The video data 602 may be sent to a processing engine that applies model 603 with video processing logic 604. The video processing logic 604 may be configured to access incoming video data 602 and modify certain aspects of that data. For instance, a third party may provide an application 606 that is designed to blur a background behind a user when the user is filming themselves. The video processing logic 604 may be designed to identify the user in the video data and blur some or all of the content that is not part of the content representing the user. The video processing logic 604 may also be used to remove certain users from a portion of video data, or remove certain objects in the user's area, or apply a mask that accentuates certain features of the user (e.g., the user's eyes) or draws cartoon-like animations over the user's face to disguise the user. Many other video manipulations are possible including adding a watermark to video data, applying a color filter, applying transcoding to reduce or improve fidelity, and many other video manipulations as provided by third-party application producers. Each of the models and video processing logic 604 may be vetted and verified to show that the model is not aware of the content of the video and that it is solely applying a known algorithm to that data.

As with the modified audio data in FIG. 5, the modified video data 605 may be encrypted before it is sent to the third-party application 606. As such, when the third-party application 606 receives the modified, encrypted video data, the third-party application may transfer that data to other users (e.g., video chat users) without having to worry about the content of the chat being available to other parties. In some cases, the third-party application 606 may transmit the encrypted, modified data to another instance of the application that is running on an electronic device belonging to another member of the video chat. The other instance of the third-party application may include a shared key with the application 606. The shared key may allow the other instance(s) of the application to decrypt the encrypted, modified data and present it to the user. For instance, a user may be wearing an augmented reality device that has a camera. That camera data 602 may be streamed on a feed that is visible to other users. The camera feed may be sent initially to the model where the video processing logic 604 is applied by the processing engine. The modified video data 605 may then be encrypted and sent from the operating system to the third-party application (potentially running on the same device). The third-party application may then transfer the encrypted camera feed to other users that may then decrypt the feed using shared keys.

As such, the third-party application may act as the transport mechanism for a secure (and modified) video feed. The third party may also be able to manipulate the data in this manner using the model without exposing the data at any point. Personally identifiable information associated with the user may be received at the processing engine and may be encrypted so that it is inaccessible to the third-party application. This may allow third parties to apply creative modifications to user's voice and image data (or other types of data) without needing to access or know the content of that data.

Figure 7:
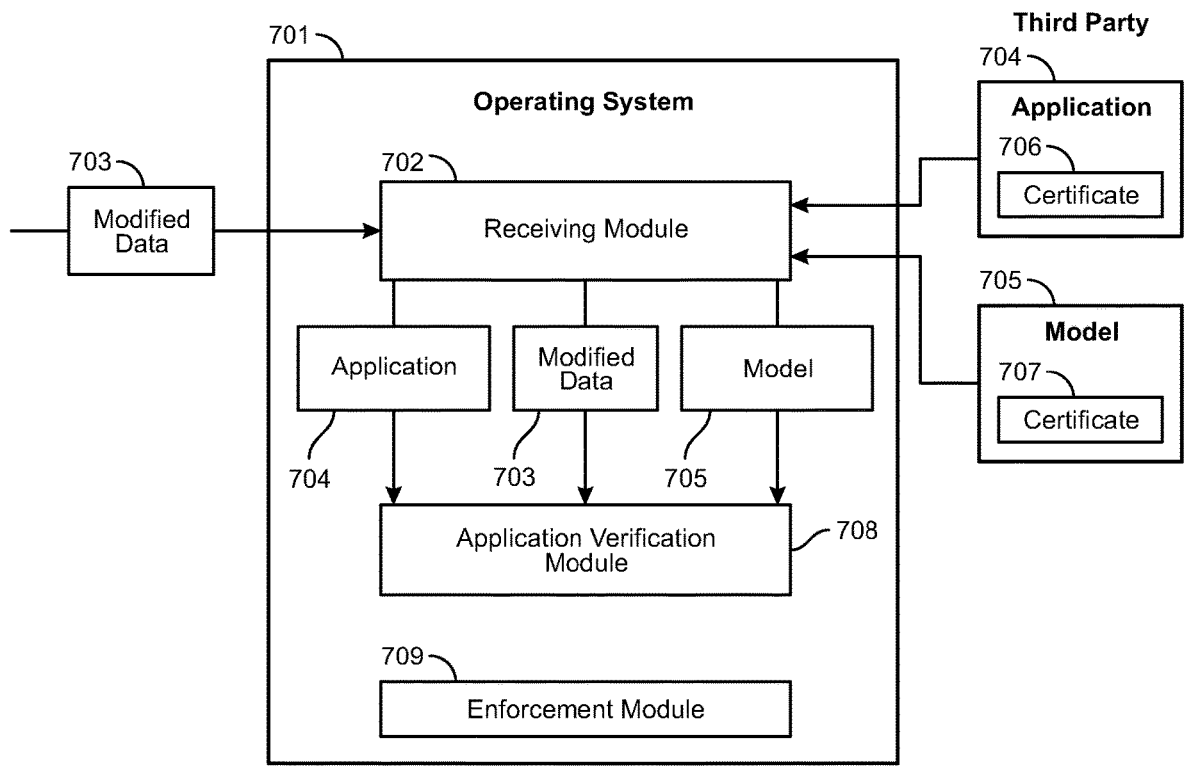
FIG. 7 illustrates an alternative example computing environment in which the embodiments herein may be executed.

In some embodiments, as shown in FIG. 7, modified data (regardless of which type of data) may be sent to an operating system which then sends the modified data to an application. The application may be running on the same computer system as the operating system, or on a different computing system. For example, operating system 701 may be running on a computer system (e.g., computer system 101 of FIG. 1). The operating system 701 may receive modified data 703 from an external processing engine (e.g., processing engine 110 of FIG. 1), or may receive raw data that is to be modified by a model 705. Indeed, the processing engine may be a stand-alone device (e.g., a special-purpose integrated circuit) or may be part of the same computer system on which operating system 701 is running. Thus, the receiving module 702 may receive modified data from an external processing engine or may receive raw data that is to be processed by an internal processing engine. The receiving module 702 may also receive a model 705 from a third party.

In some embodiments, the third party may provide a digital certificate 707 with the model 705. The third party may also provide a digital certificate 706 with their application 704. Thus, both the third-party application 704 and the model 705 may be signed as coming from the third party.

In some cases, the operating system 701 may receive the model 705 along with the application 704 from the third party. The operating system may then determine whether the application 704 was signed with a digital certificate 706. The operating system 701 may also determine whether the model was signed with a digital certificate 707. Then, if the operating system 701 determines that the application 704 and/or the model 705 was not signed with a digital certificate, the operating system may prevent the processing engine from executing the model 705 or may prevent the modified data 703 from being sent to the application 704. For example, the application verification module 708 may check to see whether the application 704 and/or the model 705 are signed with corresponding digital certificates. If so, the operating system may validate those certificates and allow the model 705 to have access to the raw data or allow the application 704 to have access to the modified data 703. If the certificates 706/707 do not appropriately identify the third party or if the certificates are invalid in any other way, the enforcement module 709 may prevent the operating system 701 from applying the model 705 or may prevent the modified data 703 from being sent to the application 704.

In some embodiments, the processing engine (e.g., 110 of FIG. 1) may provide a signal to the application indicating that a specified type of data is being received. For example, the third-party application 704 may want to display an indicator in the application that audio data is being received, or that video data is being received, or that biometric data is being received at the model. For instance, the third-party application may wish to indicate that a user is recording video data from a camera, or is talking into a microphone, but the application 704 may not know who is talking or what is being said. In the embodiments described herein, the third-party application 704 does not need to know what is being said, only that people are talking or that video is being taken. The model may be configured to provide a signal someone indicating that someone is talking or taking a video. The application may then render the display or user interface in an appropriate manner based on the signal. Such a signal may not allow the application and model to share memory or code; rather, the signal may be a simple on or off indicator for that feature.

Figure 8A:
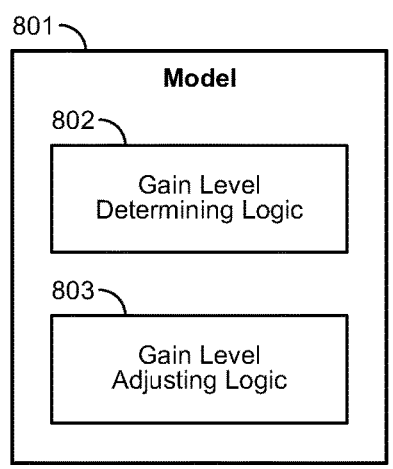
FIGS. 8A and 8B illustrate embodiments in which models may include gain-related logic and anonymizing logic, respectively.

FIG. 8A illustrates an embodiment of a model 801 that has two different types of logic (802 and 803). Each of these types of logic may be separately vetted and verified. For example, the model may be configured to process multiple different sub-modules, each of which may have a different purpose. Each of these sub-modules may be separately vetted and verified. In one embodiment, for instance, the computer-executable logic that reads the personally identifiable information may be different than the logic (e.g., the sub-module) that adjusts the personally identifiable information. Each sub-module may also be provided by a different third-party provider.

The gain level determining logic 802 may be configured to determine a current gain level for the received data. For example, if the received data is audio data, the gain level determining module 802 may determine what the current gain level is for that audio stream. If the determined gain level is too high or too low, the gain level adjusting logic 803 may be configured to adjust the gain level to a specified level either above or below the current level. In some cases, the model 801 may be configured to determine an average audio level for the data stream over a period of time. If the current level strays beyond a threshold amount from this average, the gain level adjusting logic 803 may be configured to automatically raise or lower the gain level toward the determined average audio level. In some cases, the model 801 may report the gain level to an application (e.g., third-party application 704 of FIG. 7). The third-party application may be configured to collect data, statistics, or metadata related to the incoming audio stream (or other incoming data).

Figure 8B:
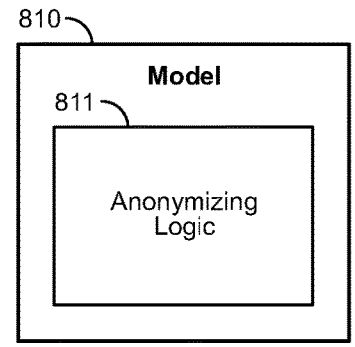

FIG. 8B illustrates an embodiment of a model 810 that is configured to anonymize the data that is received at the model. The anonymizing logic 811 of model 810 may remove data that may be used to personally identify a user. For example, the anonymizing logic 811 may obscure the background of a user's video feed or may blur out the main user's face or other surrounding user's faces. In some embodiments, the user's device may be aware of the surrounding environment and may blur certain landmarks, artwork, signs, or other indicators of the user's current location. In other embodiments, if a user is wearing a camera and is using a keyboard (either a physical or a virtual keyboard), the anonymizing logic 811 may be configured to blur the video pixels corresponding to the user's fingers or show some other image or animation over the user's fingers. This may prevent others from seeing the user type in potentially identifying information or other private information such as user names and passwords. Many other types of models may be used and each may be verified to ensure that the model only performs a limited, independently verified function, and that the model does not have any way of determining what the content of the incoming data is.

A corresponding system may include at least one physical processor and physical memory comprising computer-executable instructions that, when executed by the physical processor, cause the physical processor to: receive, from a third party, at least a portion of data or computer-executable logic that is part of a specified model, each model comprising one or more portions of independently verifiable computer-executable logic, receive data at a processing engine, the processing engine being configured to apply the specified model to the received data, execute the specified model at the processing engine to modify the received data, and send the modified data to an application that is configured to process the modified data.

A corresponding non-transitory computer-readable medium may include one or more computer-executable instructions that, when executed by at least one processor of a computing device, cause the computing device to: receive, from a third party, at least a portion of data or computer-executable logic that is part of a specified model, each model comprising one or more portions of independently verifiable computer-executable logic, receive data at a processing engine, the processing engine being configured to apply the specified model to the received data, execute the specified model at the processing engine to modify the received data, and send the modified data to an application that is configured to process the modified data.

Accordingly, the embodiments described herein may allow a third party (or even the OS provider) to provide models that perform limited, verifiable transformations to data. These transformations may provide creative and useful features that may be applied to a set of data without application publisher having access to the raw data. This may allow many different creative features to be added by third parties without the risk of those third parties accessing and improperly using data that was intended to be private. Thus, as more and more data is created by users, that data may be kept private while still allowing third parties to enhance and change that data as requested by the user.

EXAMPLE EMBODIMENTS

Example 1

A computer-implemented method for modifying data while maintaining privacy may include receiving, from a third party, a portion of data or computer-executable logic that is part of a specified model. Each model may include various portions of independently verifiable computer-executable logic. The method may further include receiving data at a processing engine. The processing engine may be configured to apply the specified model to the received data. The method may then execute the specified model at the processing engine to modify the received data and send the modified data to an application that is configured to process the modified data.

Example 2

The computer-implemented method of Example 1, wherein the application that is configured to process the modified data is prohibited from communicating with or accessing the model.

Example 3

The computer-implemented method of any of Examples 1 and 2, wherein the specified model has known outputs for each type of data produced at the processing engine.

Example 4

The computer-implemented method of any of Examples 1-3, wherein the data received at the processing engine comprises audio data from a microphone.

Example 5

The computer-implemented method of any of Examples 1-4, wherein the data received at the processing engine comprises video data from a camera.

Example 6

The computer-implemented method of any of Examples 1-5, wherein the specified model comprises a deep neural network (DNN).

Example 7

The computer-implemented method of any of Examples 1-6, further comprising encrypting the modified data before the modified data is sent to the application.

Example 8

The computer-implemented method of any of Examples 1-7, wherein the application transmits the encrypted, modified data to a second instance of the application, the second instance of the application including a shared key with the application allowing the second instance of the application to decrypt the encrypted, modified data.

Example 9

The computer-implemented method of any of Examples 1-8, wherein the application and the second instance of the application are provided by a third party.

Example 10

The computer-implemented method of any of Examples 1-9, wherein the specified model is further provided by the third party.

Example 11

The computer-implemented method of any of Examples 1-10, wherein personally identifiable information associated with a user received at the processing engine is encrypted and is inaccessible to the application provided by the third party.

Example 12

A system comprising: at least one physical processor and physical memory comprising computer-executable instructions that, when executed by the physical processor, cause the physical processor to: receive, from a third party, at least a portion of data or computer-executable logic that is part of a specified model, each model comprising one or more portions of independently verifiable computer-executable logic, receive data at a processing engine, the processing engine being configured to apply the specified model to the received data, execute the specified model at the processing engine to modify the received data, and send the modified data to an application that is configured to process the modified data.

Example 13

The system of Example 12, wherein the modified data is sent to an operating system which then sends the modified data to the application.

Example 14

Example 13: The system of Example 12 or Example 13, wherein the operating system: receives the specified model from the application, determines whether the application was signed with a digital certificate, and determines whether the specified model was signed with a digital certificate.

Example 15

The system of any of Examples 12-14, wherein upon determining that at least one of the application or the specified model was not signed with a digital certificate, the operating system prevents the processing engine from executing the specified model.

Example 16

The system of any of Examples 12-15, wherein the processing engine provides a signal to the application indicating that a specified type of data is being received.

Example 17

The system of any of Examples 12-16, wherein the specified model comprises a gain adjusting model that is configured to determine a current gain level for the received data and adjust the gain level in the modified data.

Example 18

The system of any of Examples 12-17, wherein the specified model comprises an anonymizing model that is configured to anonymize the received data.

Example 19

The system of any of Examples 12-18, wherein the processing engine that executes the specified model comprises a special-purpose integrated circuit.

Example 20

A non-transitory computer-readable medium comprising one or more computer-executable instructions that, when executed by at least one processor of a computing device, cause the computing device to: receive, from a third party, at least a portion of data or computer-executable logic that is part of a specified model, each model comprising one or more portions of independently verifiable computer-executable logic, receive data at a processing engine, the processing engine being configured to apply the specified model to the received data, execute the specified model at the processing engine to modify the received data, and send the modified data to an application that is configured to process the modified data.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
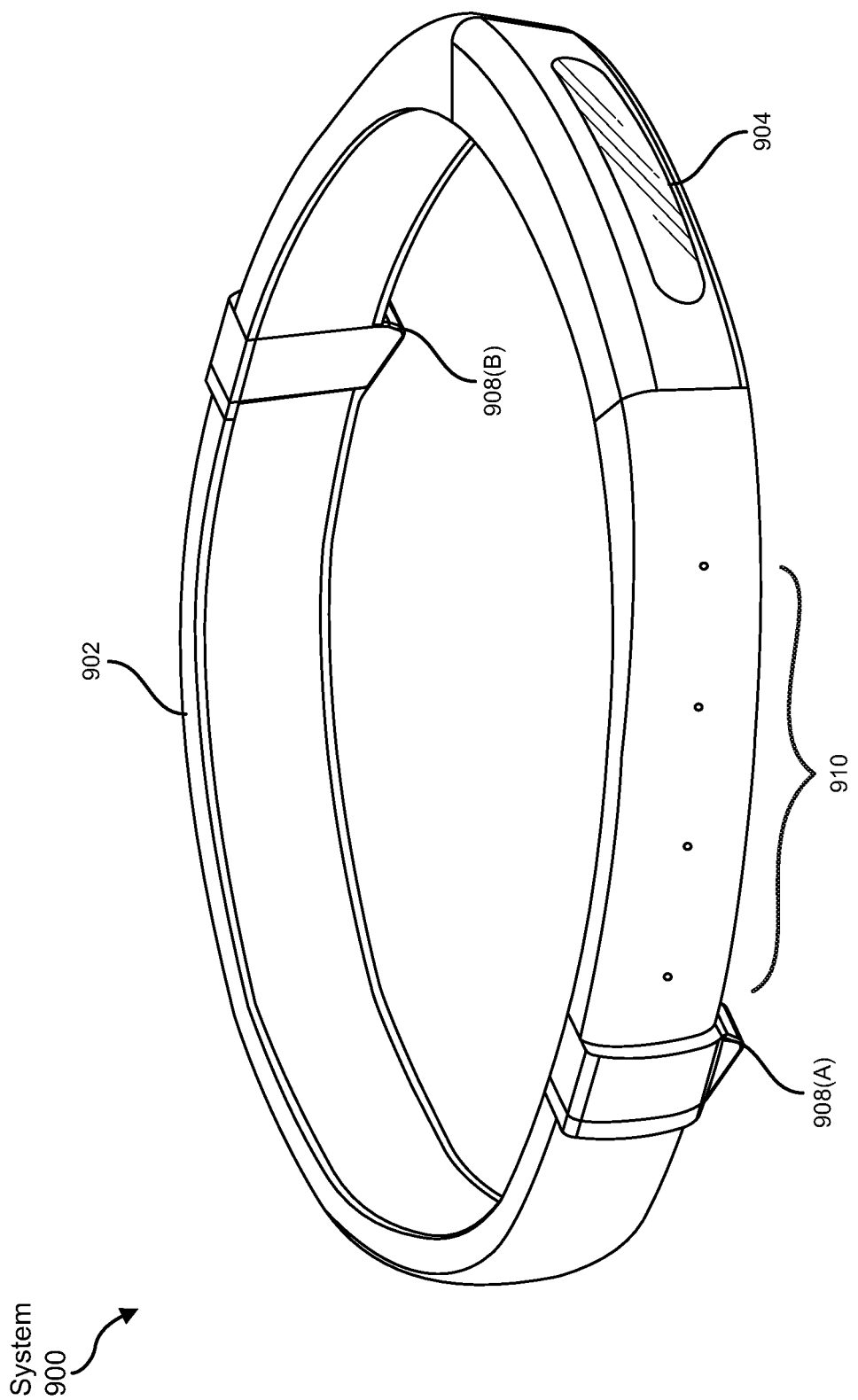
FIG. 9 is an illustration of an exemplary artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
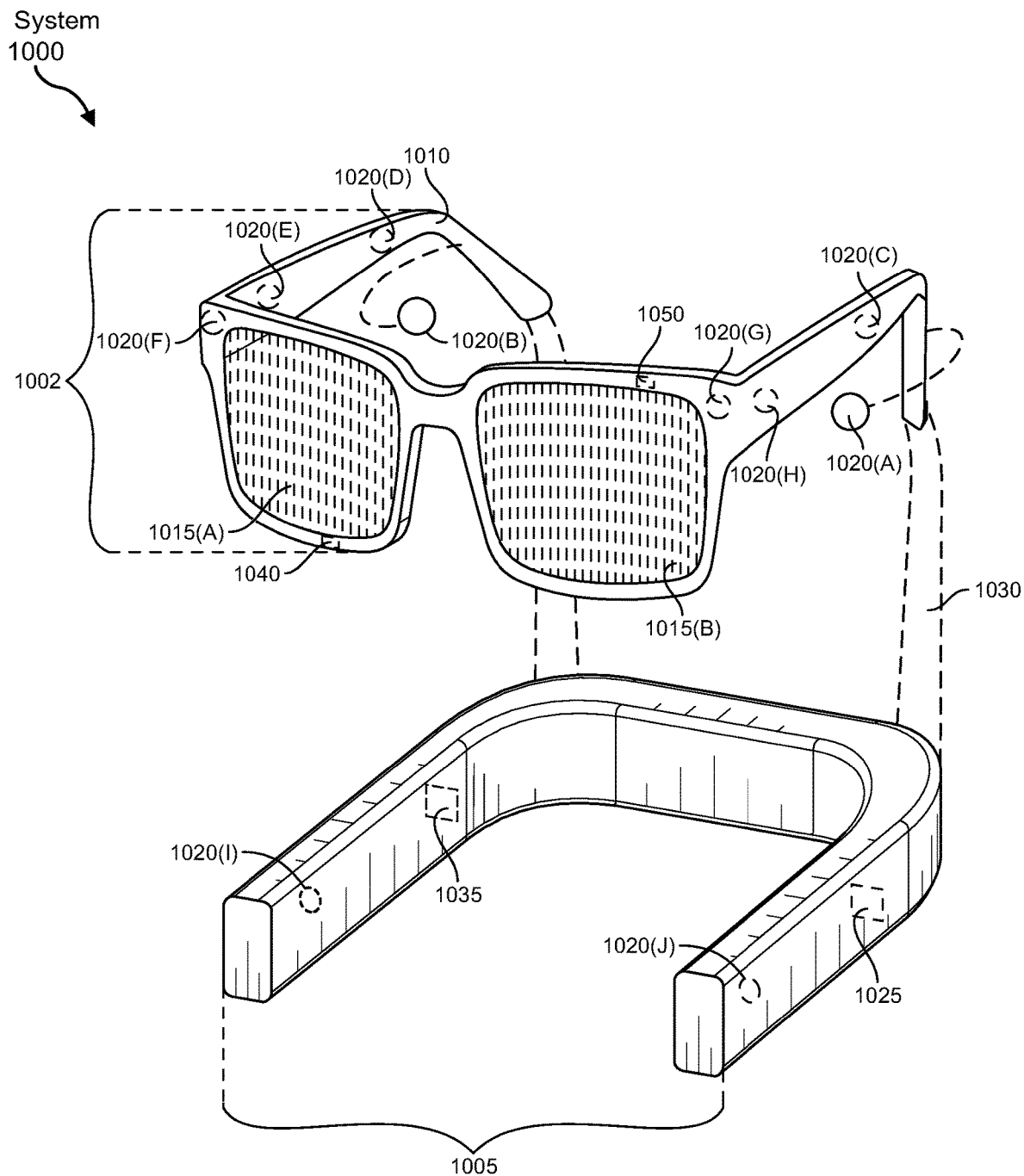
FIG. 10 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
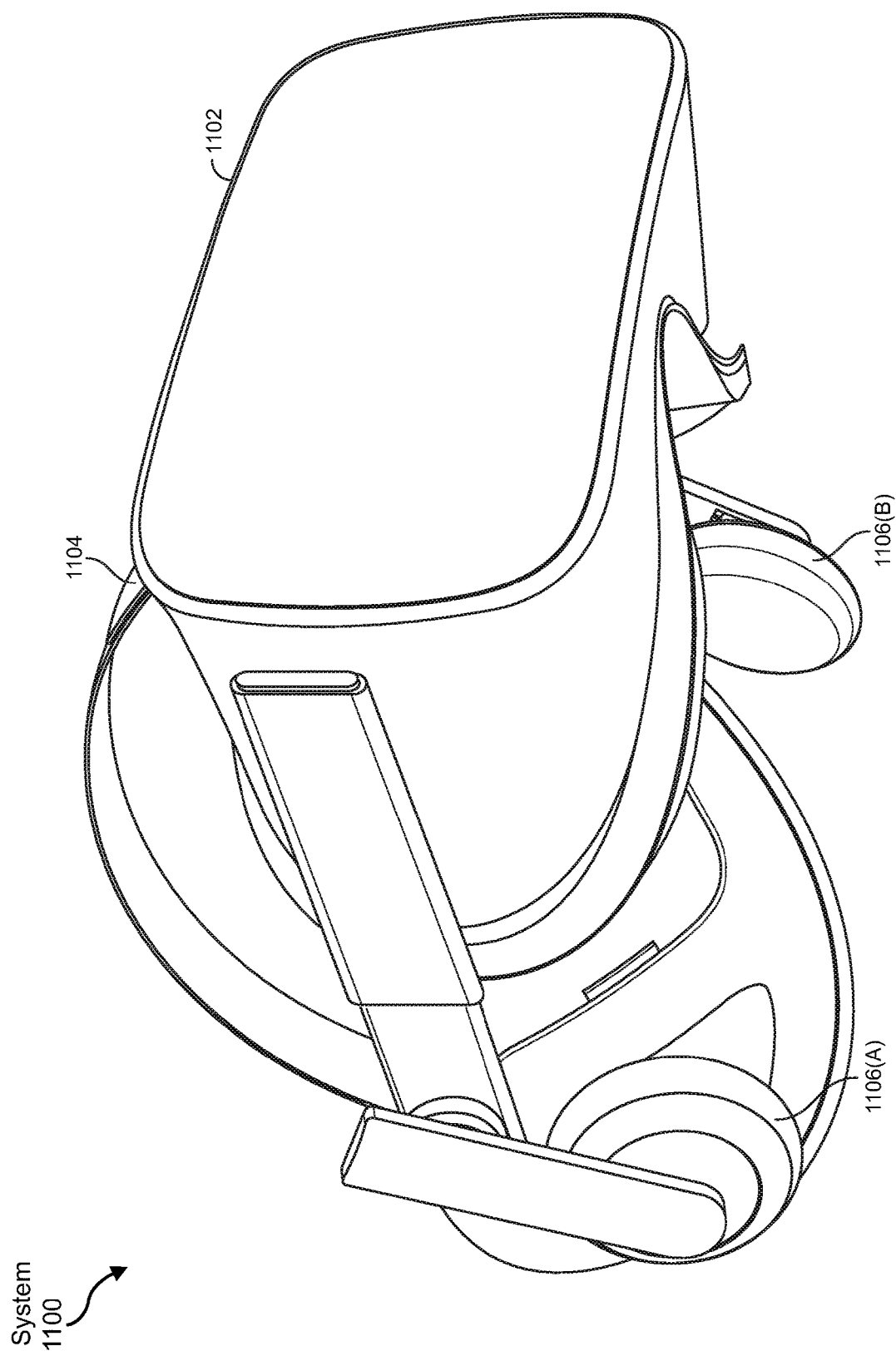
FIG. 11 is an illustration of an exemplary virtual-reality headset that may be used in connection with embodiments of this disclosure Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to allow third-party access to the data, use the result of the transformation to receive the data from the third party, and store the result of the transformation for subsequent access. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a third party, at least a portion of data or computer-executable logic that is part of a specified model, each model comprising one or more portions of independently verifiable computer-executable logic;
   receiving data at a processing engine, the processing engine being configured to apply the specified model to the received data;
   executing the specified model at the processing engine to modify the received data, wherein execution of the specified model implements one or more known inputs and corresponding known outputs that allow the specified model to make verifiable, known changes to the data while ensuring that other changes to the data are prevented;
   encrypting the modified data before the modified data is sent to an application that is configured to process the modified data; and
   sending the modified data to the application.

2. The computer-implemented method of claim 1, wherein the application that is configured to process the modified data is prohibited from communicating with or accessing the model.

3. The computer-implemented method of claim 1, wherein the specified model has known outputs for each type of data produced at the processing engine.

4. The computer-implemented method of claim 1, wherein the data received at the processing engine comprises audio data from a microphone.

5. The computer-implemented method of claim 1, wherein the data received at the processing engine comprises video data from a camera.

6. The computer-implemented method of claim 1, wherein the specified model comprises a deep neural network (DNN).

7. The computer-implemented method of claim 1, wherein the specified model is configured to anonymize at least a portion of the received data.

8. The computer-implemented method of claim 1, wherein the application transmits the encrypted, modified data to a second instance of the application, the second instance of the application including a shared key with the application allowing the second instance of the application to decrypt the encrypted, modified data.

9. The computer-implemented method of claim 8, wherein the application and the second instance of the application are provided by a third party.

10. The computer-implemented method of claim 9, wherein the specified model is further provided by the third party.

11. The computer-implemented method of claim 9, wherein personally identifiable information associated with a user received at the processing engine is encrypted and is inaccessible to the application provided by the third party.

12. A non-transitory computer-readable medium comprising one or more computer-executable instructions that, when executed by at least one processor of a computing device, cause the computing device to:
receive, from a third party, at least a portion of data or computer-executable logic that is part of a specified model, each model comprising one or more portions of independently verifiable computer-executable logic;
receive data at a processing engine, the processing engine being configured to apply the specified model to the received data;
execute the specified model at the processing engine to modify the received data, wherein execution of the specified model implements one or more known inputs and corresponding known outputs that allow the specified model to make verifiable, known changes to the data while ensuring that other changes to the data are prevented;
encrypt the modified data before the modified data is sent to an application that is configured to process the modified data; and
send the modified data to the application.

13. The non-transitory computer-readable medium of claim 12, wherein the application that is configured to process the modified data is prohibited from communicating with or accessing the model.

14. The non-transitory computer-readable medium of claim 12, wherein the specified model has known outputs for each type of data produced at the processing engine.

15. The non-transitory computer-readable medium of claim 12, wherein the data received at the processing engine comprises audio data from a microphone.

16. The non-transitory computer-readable medium of claim 12, wherein the data received at the processing engine comprises video data from a camera.

17. The non-transitory computer-readable medium of claim 12, wherein the specified model is configured to anonymize at least a portion of the received data.

18. The non-transitory computer-readable medium of claim 12, wherein the application transmits the encrypted, modified data to a second instance of the application, the second instance of the application including a shared key with the application allowing the second instance of the application to decrypt the encrypted, modified data.

19. The non-transitory computer-readable medium of claim 18, wherein the application and the second instance of the application are provided by a third party.

20. The non-transitory computer-readable medium of claim 19, wherein the specified model is further provided by the third party.

21. The non-transitory computer-readable medium of claim 19, wherein personally identifiable information associated with a user received at the processing engine is encrypted and is inaccessible to the application provided by the third party.

22. A system comprising:
at least one physical processor;
physical memory comprising computer-executable instructions that, when executed by the physical processor, cause the physical processor to:
receive, from a third party, at least a portion of data or computer-executable logic that is part of a specified model, each model comprising one or more portions of independently verifiable computer-executable logic;
receive data at a processing engine, the processing engine being configured to apply the specified model to the received data;
execute the specified model at the processing engine to modify the received data, wherein execution of the specified model implements one or more known inputs and corresponding known outputs that allow the specified model to make verifiable, known changes to the data while ensuring that other changes to the data are prevented;
encrypt the modified data before the modified data is sent to an application that is configured to process the modified data; and
send the modified data to the application.

* * * * *